(12) United States Patent
Nakae

(10) Patent No.: US 9,388,331 B2
(45) Date of Patent: Jul. 12, 2016

(54) ABRASIVE AGENT MANUFACTURING METHOD

(71) Applicant: KONICA MINOLTA, INC., Chiyoda-ku (JP)

(72) Inventor: Hazuki Nakae, Kyoto (JP)

(73) Assignee: KONICA MINOLTA, INC., Tokyo (JP)

( * ) Notice: Subject to any disclaimer, the term of this patent is extended or adjusted under 35 U.S.C. 154(b) by 66 days.

(21) Appl. No.: 14/369,915

(22) PCT Filed: Dec. 14, 2012

(86) PCT No.: PCT/JP2012/008026
§ 371 (c)(1),
(2) Date: Jun. 30, 2014

(87) PCT Pub. No.: WO2013/099143
PCT Pub. Date: Jul. 4, 2013

(65) Prior Publication Data
US 2015/0135602 A1 May 21, 2015

(30) Foreign Application Priority Data

Dec. 28, 2011 (JP) ................................. 2011-289539

(51) Int. Cl.
*C09K 3/14* (2006.01)
*C09K 13/00* (2006.01)

(52) U.S. Cl.
CPC ............. *C09K 3/1472* (2013.01); *C09K 3/1409* (2013.01); *C09K 3/1463* (2013.01)

(58) Field of Classification Search
CPC ......... C09K 3/14; C09K 13/00; C09K 3/1472
See application file for complete search history.

(56) References Cited

U.S. PATENT DOCUMENTS

| 2002/0028581 | A1 | 3/2002 | Yasui et al. | |
| 2007/0175104 | A1* | 8/2007 | Nishiyama | C09G 1/02 51/307 |
| 2011/0070737 | A1* | 3/2011 | Oh | B82Y 30/00 438/693 |
| 2011/0219704 | A1* | 9/2011 | Moon | B24B 55/12 51/309 |

FOREIGN PATENT DOCUMENTS

| JP | 10-280060 | 10/1998 |
| JP | 2000-254659 | 9/2000 |
| JP | 2002-43256 | 2/2002 |
| JP | 2003-138248 | 5/2003 |
| JP | 2005-014187 | 1/2005 |
| JP | 2006-61774 | 3/2006 |

* cited by examiner

*Primary Examiner* — Pegah Parvini
(74) *Attorney, Agent, or Firm* — Cozen O'Connor

(57) ABSTRACT

Provided is a method for manufacturing an abrasive agent including a dispersant and also including cerium oxide as a main abrasive material component. The method involves: a step for recovering an abrasive agent component by salting out a spent abrasive material slurry by using a cation of an element of the first Group or second Group with an ionic radius of 80 pm to 160 pm in six-coordinate conversion, and solid-liquid separating the cerium oxide by coagulation and sedimentation; and a step for adding a dispersant including an anionic polymer to the abrasive agent component after the recovery.

5 Claims, No Drawings

ABRASIVE AGENT MANUFACTURING METHOD

RELATED APPLICATIONS

This is a U.S. National stage of International application No. PCT/JP2012/008026 filed on Dec. 14, 2012.

This patent application claims the priority of Japanese application no. 2011-289539 filed Dec. 28, 2011, the disclosure content of which is hereby incorporated by reference.

TECHNICAL FIELD

The present invention relates to an abrasive agent manufacturing method.

BACKGROUND ART

In magnetic information recording devices, information is recorded on an information recording medium by using magnetic, optical or photomagnetic effects. A hard disk drive (referred to hereinbelow as HDD) device is a typical example of such devices.

Contemporary HDD devices are required to have a high capacity and a reduced diameter, and there is a strong demand for reducing the floating amount of a magnetic head and decreasing the unit recording area with the object of increasing the recording density. At the same time, ever more stringent requirements are placed on surface quality, such as surface roughness and fine waviness, which is required after polishing in the process of manufacturing glass substrates for HDD. This all means that enhanced polishing quality that can be compatible with a reduced amount of head floating is required.

Where an abrasive agent including cerium oxide as the main component is used to stabilize the polishing quality of glass substrates for HDD, the machining rate is known to increase over that attained with other abrasive agents due to a relationship with glass components.

Meanwhile, the possibility of reducing the amount of the abrasive agent used and reusing (recycling) the abrasive agent to save energy has been actively investigated in recent years. For example, Patent Document 1 describes a method by which a cerium-containing abrasive material slurry with decreased abrasive capacity can be recycled by regenerating the performance thereof as an abrasive agent by a simple regenerative treatment.

However, in this manufacturing method, a long time is required to recycle the abrasive agent. Yet another problem is that even if fine particles of the polished material, such as sludge, are removed, the impurities cannot be entirely removed, the remaining impurities affect the particle size or crystal structure of the abrasive material in the sintering step, and the abrasive properties are degraded by comparison with those prior to recycling.

Patent Document 1: Japanese Patent Application Publication No. 2005-14187

SUMMARY OF THE INVENTION

The present invention has been created to resolve the problems, and it is an objective of the present invention to provide an abrasive agent manufacturing method by which spent abrasive material slurry is reused, the method producing an abrasive agent of high dispersivity and polishing capacity.

The inventors have conducted a comprehensive study to attain the objective, and the results obtained demonstrate that the recovered abrasive agent components can be reused and an abrasive agent of high dispersivity and polishing capacity can be easily obtained by the below-described manufacturing method. This finding led to the creation of the present invention.

Thus, the present invention relates to a method for manufacturing an abrasive agent containing a dispersant and also including cerium oxide as a main abrasive material component, the method including: recovering an abrasive agent component by salting out a spent abrasive material slurry by using a cation of an element of the first Group or second Group with an ionic radius of 80 pm to 160 pm in six-coordinate conversion, and solid-liquid separating the cerium oxide by coagulation and sedimentation; and adding a dispersant including an anionic polymer to the abrasive agent component after the recovery. The abrasive agent, as referred to in the present invention, means the entire solution (dispersion) including an abrasive material (can be also referred to as abrasive grains) producing an abrasive action upon a substrate which is a material to be polished, and a solvent (can be also referred to as polishing liquid), which is a dispersion medium therefor, and has the same meaning as the abrasive material slurry, but in the present invention, for the sake of convenience, the abrasive agent after the use in the polishing step is called an abrasive material slurry to differentiate between the two slurries.

The present invention can provide a method for manufacturing an abrasive agent in which the spent abrasive material slurry is reused, the method making it possible to manufacture with high efficiency an abrasive agent with high dispersivity and polishing capacity.

DESCRIPTION OF EMBODIMENTS

Embodiments of the present invention are described below, but the present invention is not limited to those embodiments.

A method for manufacturing an abrasive agent according to the present embodiment is a method for manufacturing an abrasive agent including a dispersant and also including cerium oxide as a main abrasive material component, the method including: a step for recovering an abrasive agent component by salting out a spent abrasive material slurry by using a cation of an element of the first Group or second Group with an ionic radius of 80 pm to 160 pm in six-coordinate conversion, and solid-liquid separating the cerium oxide by coagulation and sedimentation; and a step for adding a dispersant including an anionic polymer having carboxylic acid to the abrasive agent component after recovery.

(Abrasive Material Slurry)

As mentioned hereinabove, the abrasive material slurry in the present embodiment includes an abrasive material including cerium oxide as the main component and a solvent and has the same meaning as an abrasive agent. However, for the sake of convenience, the abrasive material slurry after component adjustment can be referred to hereinbelow as an abrasive agent and the abrasive material slurry after the use in the polishing step, but before the component adjustment, can be simply called abrasive material slurry to distinguish the two. The cerium oxide is not particularly limited, provided it is of a type that is usually used in abrasive agents.

The content of cerium oxide is preferably 1% by mass to 10% by mass, more preferably 3% by mass to 5% by mass with respect to the total amount of the abrasive agent for substrates. When the content of cerium oxide is less than 1% by mass, the polishing may not proceed or the shape of the polished substrate may be degraded, and when the content exceeds 10% by mass, the production cost may rise.

The average particle diameter ($D_{50}$) of the cerium oxide is preferably 0.5 µm to 1.5 µm, more preferably 0.7 µm to 1.2 µm. Where the average particle diameter ($D_{50}$) of cerium oxide is less than 0.5 µm, the polishing rate can decrease, and where the average particle diameter is above 1.5 µm, the number of scratches in the glass substrate after the polishing step can increase.

The average particle diameter ($D_{50}$), as referred to herein, means a particle diameter corresponding to 50% ($D_{50}$), as a cumulative volume fraction, according to JIS R 1629-1997 "Determination of particle size distributions for fine ceramic raw powders by laser diffraction method", and is usually used to represent the average diameter of ultrafine metal particles.

An acid, an oxidizing agent, a bactericidal agent, an antimicrobial agent, a thickening agent, a dispersant, a corrosion inhibitor, a basic substance, and a pH adjusting agent may be included in addition to the abrasive material.

(Spent Abrasive Material Slurry)

The spent abrasive material slurry in the present embodiment is the abrasive material slurry that has been used once or a plurality of times in the polishing step and then recovered. The recovery method includes, for example, drawing out the abrasive material slurry remaining in a storage unit provided at a polishing machine after the completion of polishing.

Similarly to the abrasive agent, the spent abrasive material slurry includes an abrasive material containing cerium oxide as the main component. In the spent abrasive material slurry, an abrasive material and glass components are usually dispersed at a mass ratio of 1% to 10% with respect to water.

In addition to the cerium oxide and glass components, the spent abrasive material slurry can include a dispersant and impurity components (Al component, Fe component, and the like).

The abrasive agent manufacturing method in accordance with the present invention is explained below by steps thereof.

In the present embodiment, an abrasive agent is manufactured by recovering the spent slurry used in the polishing step, which is the abrasive material slurry such as described hereinabove, and reusing the recovered spent slurry.

[Abrasive Material Component Recovery Step]

Initially, the spent abrasive material slurry recovered by means such as described hereinabove is salted out by using a cation of an element of the first Group or second Group with an ionic radius of 80 pm to 160 pm in six-coordinate conversion.

The salting-out treatment in the manufacturing method of the present embodiment is the treatment for obtaining the abrasive material components that involves adding to spent abrasive material slurry a cation of an element of the first Group or second Group with an ionic radius such as indicated hereinabove, and performing solid-liquid separation by causing coagulation of the abrasive material containing cerium as the main component together with the cation and precipitation of the abrasive material by interaction with the dispersant contained in the spent abrasive material slurry.

(Cation)

The ionic radius of the cation in six-coordinate conversion is 80 pm to 160 pm, more preferably 80 pm to 120 pm. Where the ionic radius is less than 80 pm, the interaction of the ion with the dispersant is weak and the efficiency of the salt-out treatment can decrease. Further, where the ionic radius exceeds 160 pm, the interaction of the ion with the dispersant becomes too strong and the dispersants acts preferentially upon the cation, rather than upon the abrasive material. Therefore, the interaction between the remaining dispersed materials is too weak, whereby the coagulation ability of the abrasive material during the salt-out treatment is degraded.

Examples of cations with an ionic radius of 80 pm to 160 pm in six-coordination conversion include alkali metal ions, a magnesium ion, and alkaline earth metal ions. More specific examples include a lithium ion (ionic radius in six-coordination conversion: 90 pm), a sodium ion (ionic radius in six-coordination conversion: 116 pm), a potassium ion (ionic radius in six-coordination conversion: 152 pm), a magnesium ion (ionic radius in six-coordination conversion: 86 pm), a calcium ion (ionic radius in six-coordination conversion: 114 pm), a strontium ion (ionic radius in six-coordination conversion: 132 pm), and a barium ion (ionic radius in six-coordination conversion: 149 pm).

The salt-out treatment in the manufacturing method of the present embodiment is performed with a cation of an element of the first Group or an element of the second Group. The elements of the first and second Groups can be stably present as cations in an aqueous solution. Therefore the salt-out treatment can be smoothly performed.

Among the cations, at least one cation selected from the group consisting of a magnesium ion, a calcium ion, a sodium ion, and a potassium ion is preferably used. By using such cations, it is possible to perform the salt-out treatment with good efficiency.

A chloride ion or a carbonate ion can be used as an anion serving as a counter ion for the cation. A salt constituted by the cation and anion can be advantageously used as a coagulation and sedimentation agent for the coagulation and sedimentation of the abrasive agent components contained in the spent abrasive material slurry.

Among the coagulation and sedimentation agents, magnesium chloride, magnesium sulfate, calcium sulfate, calcium carbonate, potassium iodide, and sodium carbonate are more preferred because they cause small changes in the pH of the solution and facilitate the treatment of the precipitated abrasive materials and liquid waste.

Further, when a coagulation and sedimentation agent is added to the spent abrasive material slurry, the addition is preferably performed such that the cation concentration in the spent abrasive material slurry liquid is within a range of 1 mmol/L to 100 mmol/L. Where the cation concentration is less than 1 mmol/L, the coagulation effect is difficult to obtain and, therefore, the efficiency of the salt-out treatment can be degraded. Where the cation concentration exceeds 100 mmol/L, the salt remains on the substrate during reusing, the dispersion process does not proceed even with the addition of a dispersant, and the composition cannot be used as the abrasive material.

(Solid-Liquid Separation)

The solid-liquid separation in which the abrasive material contained in the spent abrasive material slurry and the cation are coagulated and the sedimentation of the abrasive material is induced will be explained below.

As mentioned hereinabove, the cation is added as a coagulation and sedimentation agent to the spent abrasive material slurry. Means (apparatus etc.) for adding the coagulation and sedimentation agent including the cation to the spent abrasive material slurry is not particularly limited, provided that the reaction with the coagulation and sedimentation agent can be effectively advanced in a well dispersed state, without causing the sedimentation of the accommodated spent abrasive material slurry.

For example, a reaction vessel of a stirring tank type which is provided with stirring means, heating means, temperature controlling means, and means for supplying the abrasive material slurry or coagulation and sedimentation agent can be used as an addition apparatus. Stirring of the abrasive material slurry or coagulation and sedimentation agent is not particularly limited and can be performed using a stirring apparatus such as a homo mixer, a homogenizer, an ultrasonic dispersing machine, and a wet ball mill.

The spent slurry with the coagulation and sedimentation agent added thereto is then subjected to solid-liquid separation into the abrasive material components (components derived from the abrasive material) and a supernatant (filtrate). Most of the glass components (Si component) contained in the abrasive agent and other impurity components (Al component, Fe component, and the like), and also part of the dispersant are solubilized or made free and move to the supernatant.

More specifically, the solid-liquid separation can be performed by allowing the spent abrasive agent slurry having the coagulation and sedimentation agent added thereto to stay in a sedimentation tank such as thickener, causing the sedimentation and separating of abrasive material particles, and causing the supernatant to overflow from the decanter or tank. Alternatively, the solid-liquid separation can be performed mechanically by centrifugal separation, centrifugal sedimentation separation, and filtration. The solid-liquid separation may be also performed by combining sedimentation separation with filtration. In the case of filtration separation, the filtration material such as filtration cloth, ceramic filter, and filtration paper can be selected according to the particle size of the abrasive material.

The solid-liquid separation of the abrasive agent components and filtrate is performed by the steps described hereinabove.

(Abrasive Agent Components)

The abrasive material components recovered in the recovery step include cerium oxide as the main abrasive material component. In addition to the cerium oxide, the recovered abrasive material components include the coagulation and sedimentation agent, dispersant, and glass components.

In the manufacturing method of the present embodiment, the recovery ratio of cerium oxide in the abrasive material components after the recovery step is 80% to 99%. The recovery ratio can be determined from the mass of cerium oxide in the abrasive material slurry before the polishing step and the mass of cerium oxide in the abrasive material components after the recovery. In the manufacturing method of the present embodiment, the abrasive material slurry can be reused with a good yield because the recovery ratio in this range can be attained.

(Solvent Addition)

A solvent may be added to the abrasive material component after the recovery step to obtain an abrasive agent.

For example, water can be used as the solvent in the present embodiment. Distilled water, ion exchange water, pure water, and ultrapure water can be used as the water. The content of the solvent in the abrasive material slurry of the present embodiment is preferably equal to or higher than 55% by mass, and more preferably equal to or higher than 75% by mass in order to facilitate further the handling of the abrasive material slurry.

The solvent may be added in the below-described dispersant addition step.

[Dispersant Addition Step]

The dispersant addition step of the present embodiment is a step for adding a dispersant including an anionic polymer as the main component to the abrasive material component after the recovery.

The dispersant of the present embodiment is used by a method including adding and stirring the dispersant including an anionic polymer. Stirring of the abrasive agent is not particularly limited and can be performed using a stirring apparatus such as a homo mixer, a homogenizer, an ultrasonic dispersing machine, and a wet ball mill.

The amount of the dispersant added is preferably 0.05% by mass to 2% by mass, more preferably 0.1% by mass to 1% by mass, with respect to the total amount of the abrasive agent. Where the amount of the dispersant added is less than 0.05% by mass, the dispersing effect can be decreased, and the amount in excess of 2% by mass is undesirable because physical properties of the abrasive liquid can be affected and an adverse effect can be produced on the polishing.

The dispersant contains an anionic polymer as the main component. More specifically, the anionic polymer is preferably contained at 80% by mass to 100% by mass. By including the polymer within such a range, it is possible to enhance further the effect of the present invention.

Specific examples of the anionic polymer include acrylic acid/maleic acid copolymer, polystyrenesulfonic acid, styrene-styrenesulfonic acid copolymer, poly{2-(meth)acryloylamino-2,2-dimethylethanesulfonic acid}, 2-(meth)acryloylamino-2,2-dimethylethanesulfonic acid-styrene copolymer, 2-(meth)acryloylamino-2,2-dimethylethanesulfonic acid-acrylamide copolymer, 2-(meth)acryloylamino-2,2-dimethylethanesulfonic acid-(meth)acrylic acid copolymer, 2-(meth)acryloylamino-2,2-dimethylethanesulfonic acid-(meth)acrylic acid-acrylamide copolymer, 2-(meth)acryloylamino-2,2-dimethylethanesulfonic acid-styrene-acrylamide copolymer, 2-(meth)acryloylamino-2,2-dimethylethanesulfonic acid-styrene-(meth)acrylic acid copolymer, naphthalenesulfonic acid formaldehyde condensate, methylnaphthalenesulfonic acid formaldehyde condensate, dimethylnaphthalenesulfonic acid formaldehyde condensate, anthracenesulfonic acid formaldehyde condensate, melaminesulfonic acid formaldehyde condensate, anilinesulfonic acid-phenol-formaldehyde condensate and salts thereof.

Among those polymers, the polymers having a carboxyl group in a molecule are preferred because they can prevent the abrasive material from coagulation and increase dispersivity.

The dispersant is most preferably an acrylic acid/maleic acid copolymer. This is because the anionic side in the acrylic acid/maleic acid copolymer is a carboxyl group and therefore the dispersivity of cerium oxide is effectively improved.

The weight-average molecular weight (Mw) of the acrylic acid/maleic acid copolymer is preferably 100 to 10,000, more preferably 1000 to 5000. Where the molecular weight (Mw) is less than 100, the dispersivity can be reduced and the polishing machinability can be degraded. Where the molecular weight exceeds 10,000, the viscosity of the abrasive material slurry increases and polishing characteristics can be degraded.

In the manufacturing method of the present embodiment, an acid, an oxidizing agent, a bactericidal agent, an antimicrobial agent, a thickening agent, a dispersant, a corrosion inhibitor, a basic substance, and a pH adjusting agent may be added to the abrasive component, dispersant, and solvent.

The amount of the solvent and the additives is preferably adjusted such that the content of cerium oxide, which is the main abrasive material component (abrasive material) in the abrasive agent which is to be finally obtained is usually 1% by mass to 10% by mass with respect to the entire amount of the abrasive agent component. It is preferred that the content of cerium oxide be within such a range because polishing ability can be maintained.

Thus, with the manufacturing method of the present embodiment, the abrasive agent including a dispersant and also including cerium oxide as the main abrasive material component can be efficiently produced by reusing the spent abrasive material slurry.

The abrasive agent obtained by the manufacturing method of the present embodiment can be used in a variety of polishing steps in a substrate manufacturing method, but is particularly suitable for use in a coarse polishing step in the substrate manufacturing method.

The abrasive agent according to the present embodiment may be used as is, or may be diluted if it is a concentrated liquid. Where the concentrated liquid is diluted, the dilution ratio is not particularly limited and can be determined, as appropriate, according to the concentration of each component in the concentrated liquid (content of the abrasive material) or polishing conditions.

The substrate to be polished by the abrasive agent according to the present embodiment is not particularly limited, but a substrate for a recording disk to be used as a recording medium, for example, a substrate for manufacturing a glass substrate for a HDD, is preferred.

The present description discloses a variety of features such as described hereinabove, and the main thereamong are summarized below.

The manufacturing method according to an aspect of the present invention is a method for manufacturing an abrasive agent comprising a dispersant and also including cerium oxide as a main abrasive material component, the method including: a step for recovering an abrasive agent component by salting out a spent abrasive material slurry by using a cation of an element of the first Group or second Group with an ionic radius of 80 pm to 160 pm in six-coordinate conversion, and solid-liquid separating the cerium oxide by coagulation and sedimentation; and a step for adding a dispersant including an anionic polymer to the abrasive agent component after recovery.

With such a configuration, the abrasive agent can be recycled more efficiently.

In the method for manufacturing an abrasive agent in accordance with the present invention, it is preferred that the cation have an ionic radius of 80 pm to 120 pm in six-coordinate conversion. With such a feature, the effect can be enhanced.

Further, in the method for manufacturing an abrasive agent in accordance with the present invention, it is preferred that the cation be at least one cation selected from the group consisting of a magnesium ion, a calcium ion, a sodium ion, and a potassium ion.

With such a feature, recycling of the abrasive agent that excels in polishing characteristics can be facilitated.

Further, in the method for manufacturing an abrasive agent in accordance with the present invention, it is preferred that the dispersant be a polymer having a carboxyl group in a molecule.

With such a feature, coagulation of the abrasive material can be prevented and dispersivity thereof can be improved.

Further, in the method for manufacturing an abrasive agent in accordance with the present invention, it is preferred that the dispersant be an acrylic acid/maleic acid copolymer with a weight-average molecular weight (Mw) of 100 to 10,000.

With such a feature, the coagulation of the abrasive material can be further prevented and dispersivity thereof can be improved.

Further, in the method for manufacturing an abrasive agent in accordance with the present invention, it is preferred that the amount of the dispersant added be 0.05% by mass to 2% by mass with respect to the total amount of the abrasive agent.

With such a feature, the coagulation can be still further prevented and dispersivity thereof can be improved.

EXAMPLES

The present invention will be explained below in greater details with reference to examples thereof, but the present invention is not limited to those examples.

Example 1

Glass Substrates

Glass substrates manufactured by the below-described steps were prepared.

(Disk Machining Step)

A glass raw material (composition is shown in Table 1) was used, the molten glass raw material was press molded, and a disk-shaped blank with an outer diameter of about 66 mm was produced. The blank thickness was 1.05 mm.

TABLE 1

| | |
|---|---|
| $SiO_2$ | 66 wt % |
| $Al_2O_3$ | 15 wt % |
| $Li_2O$ | 7 wt % |
| $Na_2O$ | 9 wt % |
| $K_2O$ | 0.5 wt % |
| CaO | 2.5 wt % |

(Disk Machining Step)

A round hole (central hole) with a diameter of 20.5 mm was opened in the central portion of the blank by using a core drill equipped with a cylindrical diamond abrasive stone. A barrel-shaped diamond abrasive stone was then used to perform inner and outer diameter machining of the outer circumferential end surface and inner circumferential end surface of the blank to an outer diameter of 65 mm and an inner diameter of 20 mm. The outer circumferential end surface and inner circumferential end surface of the glass substrate after the disk machining step was ground with an inner-outer circumference machining tool (TKV-1, manufactured by Tateno Machinery Co., Ltd.).

(Grinding Step)

The main surface of the glass substrate after an inner-outer circumferential end surface polishing step was then ground with an allowance of 35 μm by using a two-side grinding tool so as to obtain a flatness of 10 μm on the main surface. The two surfaces of the glass substrate were then ground again and the main surface was ground with an allowance of 50 μm to obtain a glass substrate flatness of 3 μm.

(Polishing Step)

An abrasive material slurry was prepared by stirring 5% by mass of cerium oxide as an abrasive agent, 0.1% by mass of an acrylic acid/maleic acid copolymer as a dispersant, and about 95% by mass of water as a solvent. The average particle diameter ($D_{50}$) of the abrasive material slurry was measured by a particle size distribution meter of a laser diffraction type (manufactured by Shimazu Seisakusho KK). The result was 1.2 μm The glass substrates obtained through the steps were then polished under the following polishing conditions by using the abrasive material slurry.

(Polishing Conditions)

Polishing tool: two-side polishing tool (manufactured by Hamai industries Ltd.)

Polishing pad: thickness 0.8 mm, average pore diameter 30 μm.

Number of polished glass substrates: 100,000.

The abrasive material slurry used in the polishing step was recovered and used in the following manner as a spent abrasive material slurry.

[Solid-Liquid Separation]

A total of 50 L of the abrasive material slurry used in the polishing step was loaded into a tank, precipitation was induced by gradually adding an aqueous solution of magnesium chloride having magnesium ions adjusted to 5 mol/L to the abrasive material slurry, and a coagulated sediment was generated.

Whether coagulation and sedimentation has occurred could be verified by whether an interface between the sediment and supernatant has occurred within a stationary period of 180 minutes after the addition and stirring.

The spent abrasive material slurry in which the coagulated sediment has been confirmed to be present was separated into supernatant and coagulated sediment by decanting the supernatant. A total of 2700 g of the abrasive agent component, which was the coagulated sediment, was recovered. The abrasive agent component included 2500 g of cerium oxide.

The cerium oxide recovery ratio was determined to be 93% by comparing the mass of cerium oxide contained before the polishing with the mass of cerium oxide contained in the recovered abrasive material component.

A total of 1000 g of the recovered abrasive material component was diluted with water such that the content of cerium oxide was 5% by mass with respect to the total amount of the abrasive material slurry. Then, 2 g of an acrylic acid/maleic acid copolymer with a weight-average molecular weight (Mw) of 500 was added as a dispersant and stirring was performed using a Three One Motor (produced by Shinto Scientific Co., Ltd) to obtain an abrasive agent 1.

[Evaluation of Dispersivity]

The particle diameter of the abrasive agent 1 was measured with a particle size distribution meter of a laser diffraction type (manufactured by Shimadzu corporation), and the determination was made according to the following criteria.

Thus, the evaluation criteria were as follows:

Very good: the variation amount with respect to the particle diameter ($D_{50}$) of the abrasive material slurry before the use is less than 10%;

Good: the variation amount with respect to the particle diameter ($D_{50}$) of the abrasive material slurry before the use is from 10% (inclusive) to less than 20%;

Poor: the variation amount with respect to the particle diameter ($D_{50}$) of the abrasive material slurry before the use is equal to or greater than 20%.

Examples 2 to 8

Comparative Examples 1 to 3

In Examples 2 to 8 and Comparative Examples 1 to 3, abrasive agents 2 to 11 were prepared in the same manner as in Example 1, except that the abrasive material component was dispersed by changing the type of the cation (salt), ion radius, amount of cation added, type of dispersant, molecular weight thereof, and the added amount thereof as shown in Table 2 below.

The recovery ratio of cerium oxide was determined, particle size measurement was performed, and the evaluation was carried out in the same manner as in Example 1, except that the abrasive agents 2 to 11 of Examples 2 to 8 and Comparative Examples 1 to 3 were used.

The results obtained in Examples 1 to 8 and Comparative Examples 1 to 3 are shown in Table 2 below.

TABLE 2

| | | Cation | | | Dispersant | | | Cerium oxide recovery ratio (%) | Dispersivity |
|---|---|---|---|---|---|---|---|---|---|
| | | Type (type of salt) | Ionic radius (pm) | Amount added (mmol/L) | Type | Molecular weight (Mw) | Amount added (% by mass) | | |
| Example 1 | Abrasive agent 1 | Magnesium ion (magnesium chloride) | 86 | 5 | Acrylic acid - maleic acid copolymer | 500 | 0.10 | 92 | Good |
| Example 2 | Abrasive agent 2 | Magnesium ion (magnesium chloride) | 86 | 5 | Acrylic acid - maleic acid copolymer | 1000 | 0.10 | 93 | Very good |
| Example 3 | Abrasive agent 3 | Magnesium ion (magnesium chloride) | 86 | 5 | Acrylic acid - maleic acid copolymer | 5000 | 0.50 | 94 | Very good |
| Example 4 | Abrasive agent 4 | Magnesium ion (magnesium chloride) | 86 | 5 | Acrylic acid - maleic acid copolymer | 10000 | 1.00 | 93 | Good |
| Example 5 | Abrasive agent 5 | Magnesium ion (magnesium chloride) | 86 | 5 | Acrylic acid - acrylamide copolymer | 5000 | 0.10 | 93 | Good |
| Example 6 | Abrasive agent 6 | Magnesium ion (magnesium chloride) | 86 | 5 | Styrene - maleic acid copolymer | 5000 | 0.10 | 94 | Good |
| Example 7 | Abrasive agent 7 | Calcium ion (calcium carbonate) | 114 | 5 | Acrylic acid - maleic acid copolymer | 5000 | 0.10 | 90 | Very good |
| Example 8 | Abrasive agent 8 | Calcium ion (calcium chloride) | 152 | 5 | Acrylic acid - maleic acid copolymer | 5000 | 0.10 | 87 | Good |
| Comparative Example 1 | Abrasive agent 9 | — | — | | Acrylic acid - maleic acid copolymer | 5000 | 0.10 | 0 | Poor |

TABLE 2-continued

| | | Cation | | | Dispersant | | Amount added (% by mass) | Cerium oxide recovery ratio (%) | Dispersivity |
|---|---|---|---|---|---|---|---|---|---|
| | | Type (type of salt) | Ioinc radius (pm) | Amount added (mmol/L) | Type | Molecular weight (Mw) | | | |
| Comparative Example 2 | Abrasive agent 10 | Rubidium ion (rubidium chloride) | 166 | 5 | Acrylic acid - maleic acid copolymer | 5000 | 0.10 | 0 | Poor |
| Comparative Example 3 | Abrasive agent 11 | Magnesium ion (magnesium chloride) | 86 | 5 | — | — | — | 94 | Poor |

As shown in Table 2, in the abrasive agents 1 to 4 of Examples 1 to 4, because the precipitation was performed using magnesium ions with an ionic radius of 80 pm to 160 pm in six-coordinate conversion and the abrasive material component, which was the coagulated sediment, was dispersed using an acrylic acid/maleic acid copolymer having an anionic polymer as a dispersant, it was possible to obtain an abrasive agent with a good recovery ratio and dispersivity on par with that of the abrasive material slurry before the use. In particular, in Examples 2 and 3, in which the dispersion was obtained using the acrylic acid/maleic acid copolymer with a molecular weight (Mw) of 1000 to 5000, an abrasive agent with high polishing ability could be obtained because the dispersivity same as that of the abrasive material slurry before the use could be obtained.

The dispersivity was also maintained in abrasive agents 5 and 6 of Examples 5 and 6 that used a dispersant including as the main component an anionic polymer having no carboxyl groups. Further, the dispersivity was also maintained in abrasive agents 7 and 8 of Examples 7 and 8 because the precipitation was performed using calcium ions and potassium ions with an ionic radius of 80 pm to 160 pm in six-coordinate conversion.

Meanwhile, in the abrasive agent 9 of Comparative Example 1, the abrasive agent component was dispersed by filtration, without performing the precipitation, with the abrasive agent same as that of Example 3, but the recovery ratio was poor and the particle size distribution of the abrasive substance was greatly distorted by impurities. In the abrasive agent 10 of Comparative Example 2, the precipitation was performed using rubidium chloride ions with an ionic radius of 166 pm in six-coordinate conversion; the slurry recovery ratio was poor and no reuse was possible. In the abrasive agent 11 of Comparative Example 3, the abrasive material component was diluted with water and no dispersing agent was used. As a result, the dispersivity was degraded.

This application is based on Japanese Patent Application No. 2011-289539 filed on Dec. 28, 2011, and the contents thereof are incorporated in the present application.

The present invention has been adequately and sufficiently explained hereinabove on the basis of embodiments thereof with reference to the appended drawings in order to describe the present invention, but it should be recognized that the embodiments could be easily changed and/or modified by a person skilled in the art. Therefore, changes or modifications implemented by a person skilled in the art should be construed to be included in the scope of rights delineated in the claims, provided that the changes or modifications do not depart from the scope of rights delineated in the claims.

INDUSTRIAL APPLICABILITY

The present invention has broad industrial applicability in the technical field of abrasive agents for substrates and substrates.

The invention claimed is:

1. A method for manufacturing an abrasive agent comprising a dispersant and further including cerium oxide as a main abrasive material component,
the method comprising:
recovering an abrasive agent component by salting out a spent abrasive material slurry by using a cation which is at least one cation selected from the group consisting of a magnesium ion and a calcium ion, wherein said cation has an ionic radius of 80 pm to 160 pm in six-coordinate conversion, and solid-liquid separating the cerium oxide by coagulation and sedimentation; and
adding a dispersant including an anionic polymer to the abrasive agent component after the recovery.

2. The method for manufacturing an abrasive agent according to claim 1, wherein the cation has an ionic radius of 80 pm to 120 pm in six-coordinate conversion.

3. The method for manufacturing an abrasive agent according to claim 1, wherein the dispersant is a polymer having a carboxyl group in a molecule.

4. The method for manufacturing an abrasive agent according to claim 3, wherein the dispersant is an acrylic acid/maleic acid copolymer with a weight-average molecular weight (Mw) of 100 to 10,000.

5. The method for manufacturing an abrasive agent according to claim 1, wherein the amount of the dispersant added is 0.05% by mass to 2% by mass with respect to a total amount of the abrasive agent.

* * * * *